(12) United States Patent
Weekly

(10) Patent No.: US 6,769,108 B2
(45) Date of Patent: Jul. 27, 2004

(54) TRIANGULAR ASSIGNMENT OF PINS USED FOR DIAGONAL INTERCONNECTIONS BETWEEN DIAGONAL CHIPS IN A MULTI-CHIP MODULE

(75) Inventor: Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 10/099,776

(22) Filed: Mar. 14, 2002

(65) Prior Publication Data

US 2003/0177466 A1 Sep. 18, 2003

(51) Int. Cl.$^7$ .............................................. G06F 17/50
(52) U.S. Cl. ............................ 716/16; 716/12; 716/13; 716/14; 716/15
(58) Field of Search ........................ 716/1–18; 257/202, 257/240, 401, 776, 777, 778, 786

(56) References Cited

U.S. PATENT DOCUMENTS

| | | | |
|---|---|---|---|
| 5,832,294 A | 11/1998 | Reinschmidt .......... | 395/800.32 |
| 5,909,587 A | 6/1999 | Tran ...................... | 395/800.01 |
| 6,111,756 A | * 8/2000 | Moresco .................. | 361/735 |
| 6,194,738 B1 | 2/2001 | Debenham et al. ........... | 257/48 |
| 6,205,570 B1 | 3/2001 | Yamashita .................... | 716/1 |
| 6,289,494 B1 | * 9/2001 | Sample et al. ................. | 716/12 |
| 6,407,434 B1 | * 6/2002 | Rostoker et al. ............. | 257/401 |

OTHER PUBLICATIONS

Jun Dong Cho, "Wiring Space and Length Estimation in Two–Dimensional Arrays," IEEE, May 2000, pp. 612–615.*

Cong et al., "Interconnect Layout Optimization Under Higher Order RLC Model for MCM Designs," IEEE, Dec 2001, pp. 1455–1463.*

Das et al., "High Performance MCM Routing: A New Approach," IEEE, Jan 10, 1999, pp. 1–6.*

Chuek et al., "A Structured Approach for Routing of MCMs," IEEE, May 1997, pp. 255–259.*

Das et al., "Routing of L–Shaped Channels, Switchboxes and Staircases in Manhattan–Diagonal Model," IEEE, 1997, pp. 65–70.*

Tan et al., "Improvement on the Diagonal Routing Model," IEEE, Dec 1994, pp. 535–536.*

* cited by examiner

Primary Examiner—Vuthe Siek
(74) Attorney, Agent, or Firm—Robert A. Voigt, Jr.; Winstead Sechrest & Minick P.C.; Casimer K. Salys

(57) ABSTRACT

A system for minimizing the length of the longest diagonal interconnection. A multiple chip module may comprise a first chip connected to a second chip located diagonally to the first chip. The first and second chip are interconnected by one or more interconnections commonly referred to as diagonal interconnections. Since the one or more diagonal interconnections between the first chip and the second chip are interconnected between a set of pins on each chip that form a triangular pattern, the longest diagonal interconnection is substantially the same length as the length of the longest orthogonal interconnection. Furthermore, since the one or more diagonal interconnections between the first chip and the second chip are interconnected between a set of pins on each chip that form a triangular pattern, the longest diagonal interconnection is substantially the same length as the length of the second longest diagonal interconnection.

4 Claims, 10 Drawing Sheets

| ORTHOGONAL LENGTHS → | 702A | 702B | 702C | 702D | 702E | 702F | 702G | 702H 701 |
|---|---|---|---|---|---|---|---|---|
| DIAGONAL DISTANCES ↓ | 0 A | 0.8007 B | 1.6014 C | 2.402 D | 3.2027 E | 4.0034 F | 4.8041 G | 5.6048 H |
| 703A–1 | | | | | | | | |
| 703B–2 | 0.2003 | | | | | | | |
| 703C–3 | 0.601 | 1.8017 | | | | | | |
| 703D–4 | 1.0017 | 2.2024 | 3.8037 | | | | | |
| 703E–5 | 1.4024 | 2.6031 | 4.2044 | 5.4051 | | | | |
| 6 | 1.8031 | 3.0037 | 4.6051 | 5.8058 | 7.0065 | | | |
| 7 | 2.2037 | 3.4044 | 5.0058 | 6.2065 | 7.4071 | 8.6078 | | |
| 8 | 2.6044 | 3.8051 | 5.4065 | 6.6071 | 7.8078 | 9.0085 | 9.8085 | |
| 9 | 3.0051 | 4.2058 | 5.8071 | 7.0078 | 8.2085 | 9.4092 | 10.209 | 11.41 |
| 10 | 3.4058 | 4.6065 | 6.2078 | 7.4085 | 8.6092 | 9.8099 | 10.61 | 11.811 |
| 11 | 3.8065 | 5.0071 | 6.6085 | 7.8092 | 9.0099 | 10.211 | 11.011 | 12.211 |
| 12 | 4.2071 | 5.4078 | 7.0092 | 8.2099 | 9.4105 | 10.611 | 11.411 | 12.612 |
| 13 | 4.6078 | 5.8085 | 7.4099 | 8.6105 | 9.8112 | 11.012 | 11.812 | 13.013 |
| 14 | 5.0085 | 6.2092 | 7.8105 | 9.0112 | 10.212 | 11.413 | 12.213 | 13.413 |
| 15 | 5.4092 | 6.6099 | 8.2112 | 9.4119 | 10.613 | 11.813 | 12.613 | 13.814 |
| 16 | 5.8099 | 7.0105 | 8.6119 | 9.8126 | 11.013 | 12.214 | 13.014 | 14.215 |
| 17 | 6.2105 | 7.4112 | 9.0126 | 10.213 | 11.414 | 12.615 | 13.415 | 14.615 |
| 18 | 6.6112 | 7.8119 | 9.4133 | 10.614 | 11.815 | 13.015 | 13.815 | 15.016 |
| 19 | 7.0119 | 8.2126 | 9.8139 | 11.015 | 12.215 | 13.416 | 14.216 | 15.417 |
| 20 | 7.4126 | 8.6133 | 10.215 | 11.415 | 12.616 | 13.817 | 14.617 | 15.817 |
| 21 | 7.8133 | 9.0139 | 10.615 | 11.816 | 13.017 | 14.217 | 15.017 | 16.218 |
| 22 | 8.2139 | 9.4146 | 11.016 | 12.217 | 13.417 | 14.618 | 15.418 | 16.619 |
| 23 | 8.6146 | 9.8153 | 11.417 | 12.617 | 13.818 | 15.019 | 15.819 | 17.019 |
| 24 | 9.0153 | 10.216 | 11.817 | 13.018 | 14.219 | 15.419 | 16.219 | 17.42 |
| 25 | 9.416 | 10.617 | 12.218 | 13.419 | 14.619 | 15.82 | 16.62 | 17.821 |
| 26 | 9.8167 | 11.017 | 12.619 | 13.819 | 15.02 | 16.221 | 17.021 | 18.221 |
| 27 | 10.217 | 11.418 | 13.019 | 14.22 | 15.421 | 16.621 | 17.421 | 18.622 |
| 28 | 10.618 | 11.819 | 13.42 | 14.621 | 15.821 | 17.022 | 17.822 | 19.023 |
| 29 | 11.019 | 12.219 | 13.821 | 15.021 | 16.222 | 17.423 | 18.222 | 19.423 |
| 30 | 11.419 | 12.62 | 14.221 | 15.422 | 16.623 | 17.823 | 18.623 | 19.824 |
| 31 | 11.82 | 13.021 | 14.622 | 15.823 | 17.023 | 18.224 | 19.024 | 20.225 |
| 703N–32 | 12.221 | 13.421 | 15.023 | 16.223 | 17.424 | 18.625 | 19.425 | 20.626 |

| | | | | | | |
|---|---|---|---|---|---|---|
| 1 | | | | | | |
| 2 | 1 | | | | | |
| 3 | 1 | 1 | | | | |
| 4 | | | | | | |
| 5 | 1 | 1 | 1 | 0 | | |
| 6 | 1 | 1 | 1 | 0 | | |
| 7 | 1 | 1 | 0 | 0 | | |
| 8 | | | | | | |
| 9 | 1 | 1 | 0 | 0 | 0 | 0 |
| 10 | 1 | 1 | 0 | 0 | 0 | 0 |
| 11 | 1 | 0 | 0 | 0 | 0 | 0 |
| 12 | | | | | | |
| 13 | 0 | 0 | 0 | 0 | 0 | 0 |
| 14 | 0 | 0 | 0 | 0 | 0 | 0 |
| 15 | 0 | 0 | 0 | 0 | 0 | 0 |
| 16 | | | | | | |
| 17 | 0 | 0 | 0 | 0 | 0 | 0 |
| 18 | 0 | 0 | 0 | 0 | 0 | 0 |
| 19 | 0 | 0 | 0 | 0 | 0 | 0 |
| 20 | | | | | | |
| 21 | 0 | 0 | 0 | 0 | 0 | 0 |
| 22 | 0 | 0 | 0 | 0 | 0 | 0 |
| 23 | 0 | 0 | 0 | 0 | 0 | 0 |
| 24 | | | | | | |
| 25 | 0 | 0 | 0 | 0 | 0 | 0 |
| 26 | 0 | 0 | 0 | 0 | 0 | 0 |
| 27 | 0 | 0 | 0 | 0 | 0 | 0 |

Fig. 7C

| | | | | |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | 0 | | | |
| 11 | 0 | 0 | | |
| 12 | | | | |
| 13 | 0 | 0 | | |
| 14 | 0 | 0 | 0 | |
| 15 | 0 | 0 | 0 | 0 |
| 16 | | | | |
| 17 | 0 | 0 | 0 | 0 |
| 18 | 0 | 0 | 0 | 0 |
| 19 | 0 | 0 | 0 | 0 |
| 20 | | | | |
| 21 | 0 | 0 | 0 | 0 |
| 22 | 0 | 0 | 0 | 0 |
| 23 | 0 | 0 | 0 | 0 |
| 24 | | | | |
| 25 | 0 | 0 | 0 | 0 |
| 26 | 0 | 0 | 0 | 0 |
| 27 | 0 | 0 | 0 | 0 |

Fig. 7D

TRIANGULAR ASSIGNMENT OF PINS USED FOR DIAGONAL INTERCONNECTIONS BETWEEN DIAGONAL CHIPS IN A MULTI-CHIP MODULE

TECHNICAL FIELD

The present invention relates to the field of multi-chip modules, and more particularly to triangularly assigning pins used for diagonal interconnections to minimize the length of the longest diagonal interconnection in a multi-chip module.

BACKGROUND INFORMATION

Circuit boards with multiple Very Large Scale Integrated (VLSI) circuit chips are called Multi-Chip Modules (MCM). Performance of an MCM may be affected at least in part by the length of interconnections between chips. The longer the distance of an interconnection between chips, the greater the time for a signal to be transmitted from one chip to another chip. Hence, the longer the distance of an interconnection between chips, the lower the processing speed of the MCM.

In an MCM, each chip may be interconnected with another adjacent or diagonal chip within the substrate. The interconnection between adjacent chips may commonly be referred to as an "orthogonal" interconnection. The interconnection between chips diagonal to one another may commonly be referred to as a "diagonal" interconnection. Typically, the orthogonal interconnections are shorter in distance than the diagonal interconnections. In fact, the diagonal interconnections may be forty percent (40%) longer than orthogonal interconnections.

If the length of the longest diagonal interconnection can be made with a length no longer than the length of the longest orthogonal interconnection, the performance of the MCM may be improved. That is, by minimizing the length of the longest diagonal interconnection to be substantially the same length as the length of the longest orthogonal interconnection, the performance of the MCM may be improved by improving the processing speed of the MCM.

It would therefore be desirable to minimize the length of the longest diagonal interconnection to be substantially the same length as the length of the longest orthogonal interconnection in a multi-chip module in order to improve the performance of the multi-chip module.

SUMMARY

The problems outlined above may at least in part be solved in some embodiments by assigning pins used for diagonal interconnections to form a triangular pattern thereby allowing the length of the longest diagonal interconnection to be substantially the same length as the length of the longest orthogonal interconnection. Further, by assigning pins used for diagonal interconnections to form a triangular pattern, the length of the longest diagonal interconnection may be substantially the same length as the length of the second longest diagonal interconnection.

In one embodiment of the present invention, a multiple chip module may comprise a first chip, a second chip located adjacent to the first chip and a third chip located diagonally to the first chip. The first and the second chip are interconnected by one or more orthogonal interconnections. The first and the third chip are interconnected by one or more diagonal interconnections. Since the one or more diagonal interconnections between the first chip and the third chip are interconnected between a set of pins on each chip that form a triangular pattern, the longest diagonal interconnection is substantially the same length as the length of the longest orthogonal interconnection. Further, since the one or more diagonal interconnections between the first chip and the third chip are interconnected between a set of pins on each chip that form a triangular pattern, the longest diagonal interconnection is substantially the same length as the length of the second longest diagonal interconnection.

A method for identifying pin locations to be used for diagonal interconnections in a multiple chip module may comprise the step of calculating the lengths of a plurality of orthogonal interconnections from pin locations on a particular chip to corresponding pin locations on an adjacent chip in a multi-chip module. Furthermore, the lengths of a plurality of diagonal interconnections from pin locations on a particular chip to corresponding pin locations on a diagonal chip may be calculated.

A threshold value may then be received from a user. The threshold value may indicate a maximum diagonal interconnection distance between a pin in a first chip and a corresponding pin in a second chip where the second chip is diagonal to the first chip. The threshold value received may be less than or equal to the longest orthogonal distance thereby ensuring that the longest diagonal interconnection may be substantially the same length as the longest orthogonal interconnection. Furthermore, since the threshold value received may be less than or equal to the longest orthogonal distance, the length of the longest diagonal interconnection may be substantially the same length as the second longest diagonal interconnection.

A first number, e.g., sixteen, of available pin positions in a chip associated with diagonal interconnection distances at or below the threshold value may be tagged with a first value, e.g., number "1." That is, a first number, e.g., sixteen, of pin positions not reserved for non-connecting purposes that are associated with diagonal interconnection distances at or below the threshold value may be tagged with a first value, e.g., number "1." The first number of pin positions tagged with the first value may be the pin positions in a chip whose lengths for diagonal interconnections with corresponding pin positions in a diagonal chip are at or below the threshold value.

The remaining available pin positions may be tagged with a second value, e.g., number "0." That is, the remaining number of pin positions reserved for non-connecting purposes may be tagged with a second value, e.g., number "0."

A determination may then be made as to whether the first number, e.g., sixteen, of pins tagged with a first value is an appropriate number of pin locations to be used for diagonal interconnections. That is, a determination may be made as to whether the first number of pins tagged with a first value is not too high or too low of a number of pin locations to be used for diagonal interconnections. If the first number, e.g., sixteen, of pins tagged is an appropriate number of pin locations to be used for diagonal interconnections, then the pin positions marked with a first value may be used for diagonal interconnections. The pattern formed by the set of pins used for diagonal interconnections may appear to form a triangular pattern. Further, at least a portion of the pin positions marked with a second value may be used for orthogonal interconnections.

If the first number, e.g., sixteen, of pins tagged is not an appropriate number of pin locations to be used for diagonal interconnections, then an updated threshold value may be received from the user. An updated threshold value may be a value that is greater than or less than the previously used threshold value. Upon receiving the updated threshold value, the number of available pin positions in a chip associated with distances at or below the updated threshold value may be tagged with a first value, e.g., number "1", as discussed above.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIGS. 7A–D illustrate a spreadsheet used to identify pin locations on a chip in a multiple chip module that should be used for diagonal or orthogonal signal pins.

DETAILED DESCRIPTION

Figure 1:
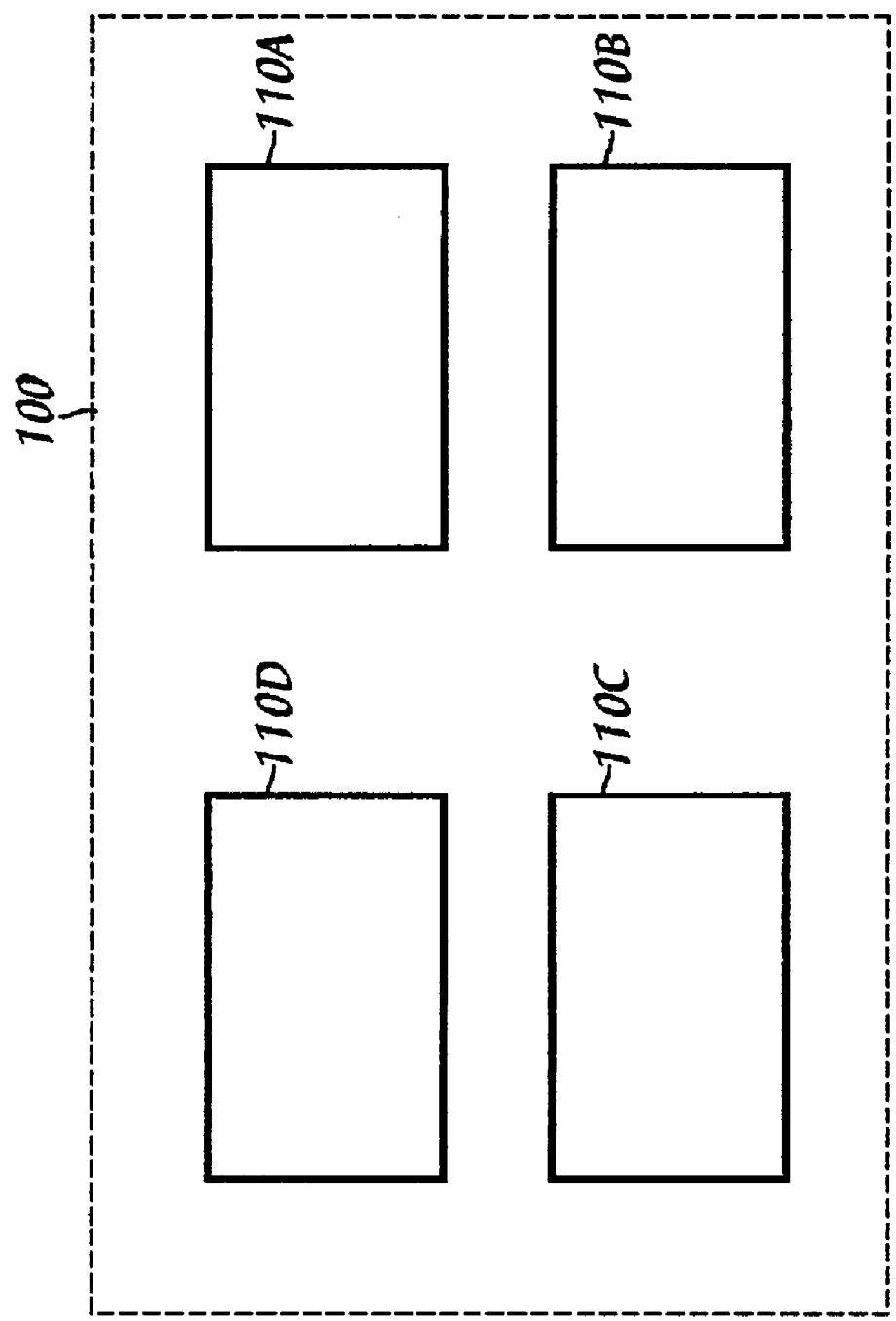
FIG. 1 illustrates a multiple chip module configured in accordance with the present invention.

FIG. 1—Multiple Chip Module

FIG. 1 illustrates an embodiment of the present invention of a multiple chip module (MCM) 100. Multiple chip module 100 may comprise a plurality of Very Large Scale Integrated (VLSI) circuit chips 110A–D (hereinafter referred to simply as "chips"). Chips 110A–D may collectively or individually be referred to as chips 110 or chip 110, respectively. In one embodiment, each chip 110 may be configured to be substantially identical. Furthermore, in one embodiment, each chip 110 of MCM 100 may be rotated ninety degrees (90°) with respect to each adjacent chip 110. Each chip 110 may comprise a plurality of pins (not shown) used to enable chip 110 to be interconnected with another adjacent or diagonal chip 110. These interconnections may be completely contained within the substrate of MCM 100. The interconnection between adjacent chips may commonly be referred to as an "orthogonal" interconnection. The interconnection between chips diagonal to one another may commonly be referred to as a "diagonal" interconnection. For example, the interconnections between chip 110A and chip 110B and between chip 110A and chip 110D are orthogonal interconnections. The interconnections between chip 110A and chip 110C are diagonal interconnections. Traditional pin assignments for diagonal interconnections is described further below in FIG. 2. It is noted that MCM 100 may comprise any number of chips 110 arranged in any type of pattern. It is further noted that FIG. 1 is illustrative.

Figure 2:
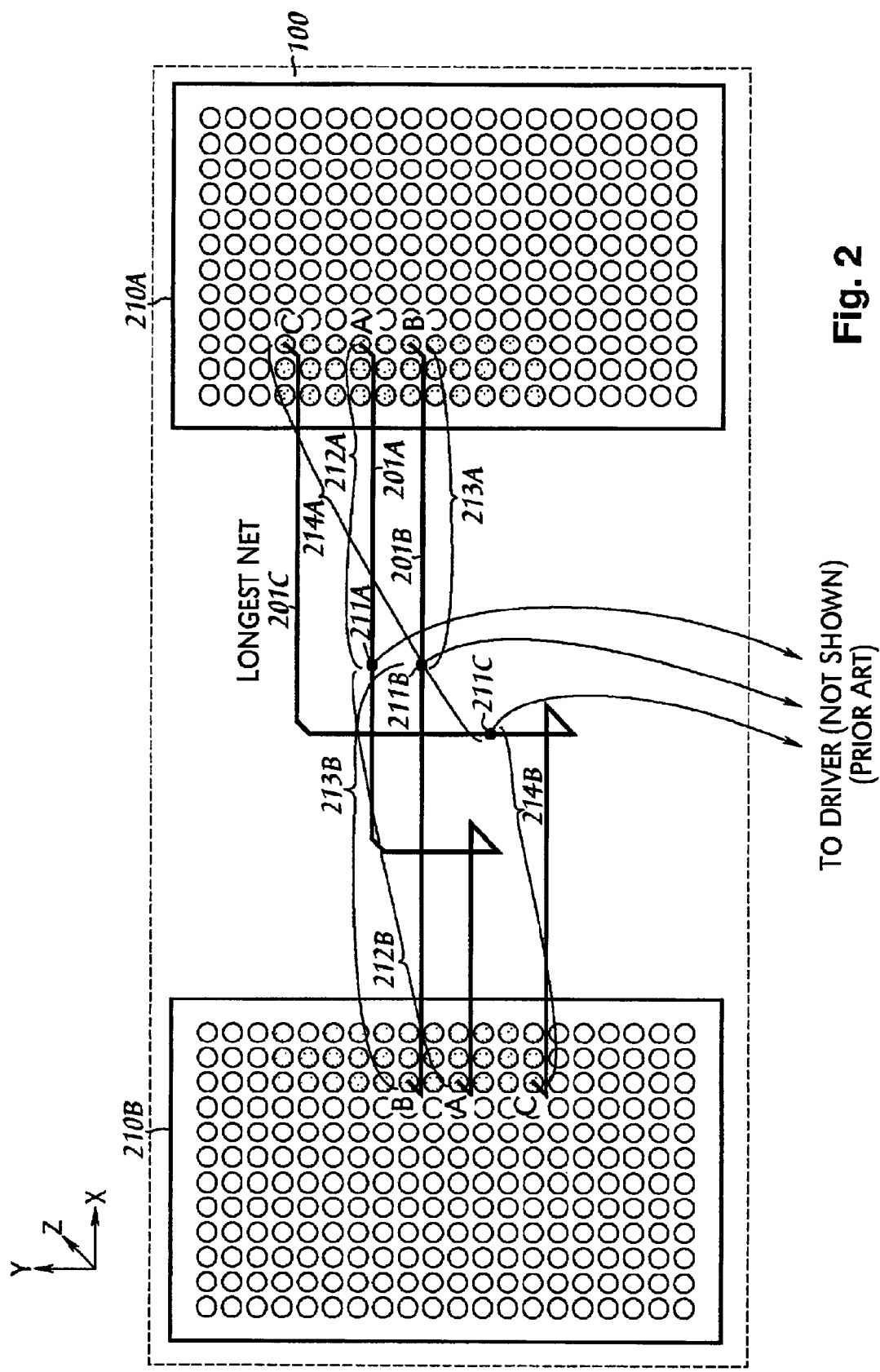
FIG. 2 illustrates a traditional pin assignment.

FIG. 2—Traditional Pin Assignments

FIG. 2 illustrates traditional pin assignments for interconnections between chips. Referring to FIG. 2, FIG. 2 depicts three orthogonal interconnections 201A–C between chip 210A and chip 210B in MCM 100. Chips 210A and chips 210B are configured substantially the same as chip 110. Chips 210A–B may collectively or individually be referred to as chips 210 or chip 210, respectively. Orthogonal interconnections 201A–C may collectively or individually be referred to as orthogonal interconnections 201 or orthogonal interconnection 201, respectively. Orthogonal interconnection 201A refers to an interconnection between pin labeled "a" in chip 210A and pin labeled "a" in chip 210B including a via length in the substrate of MCM 100. A via may refer to an interconnection between two or more layers in the substrate of MCM 100. A via may be represented by interconnections 201 routed in the z direction as illustrated in FIG. 2. In one embodiment, orthogonal interconnection 201A may comprise two interconnections, i.e., nets, labeled 212A, 212B, that are separated at point 211A. A receiver (not shown) may be located on the outer edge of each chip 210, e.g., chips 210A, 210B. A receiver (not shown) may refer to a hardware device that receives a signal transmitted by another chip 210. A driver (not shown) may be located outside MCM 100 configured to drive a signal to both receivers (not shown) in chips 210A, 210B, concurrently, via nets 212A, 212B.

Similarly, orthogonal interconnection 201B refers to an interconnection between pin labeled "b" in chip 210A and pin labeled "b" in chip 210B including the via length in the substrate of MCM 100. In one embodiment, orthogonal interconnection 201B may comprise two interconnections, i.e., nets, labeled 213A, 213B, that are separated at point 211B. A driver (not shown) may be located outside MCM 100 configured to drive a signal to both receivers (not shown) in chips 210A, 210B, concurrently, via nets 213A, 213B.

Orthogonal interconnection 201C refers to an interconnection between pin labeled "c" in chip 210A and pin labeled "c" in chip 210B including the via length in the substrate of MCM 100. In one embodiment, orthogonal interconnection 201C may comprise two interconnections, i.e., nets, labeled 214A, 214B, that are separated at point 211C. A driver (not shown) may be located outside MCM 100 configured to drive a signal to both receivers (not shown) in chips 210A, 210B, concurrently, via nets 214A, 214B. It is noted that there may be a different number of orthogonal interconnections 201 between chip 210A and chip 210B and that FIG. 2 is illustrative.

Figure 3:
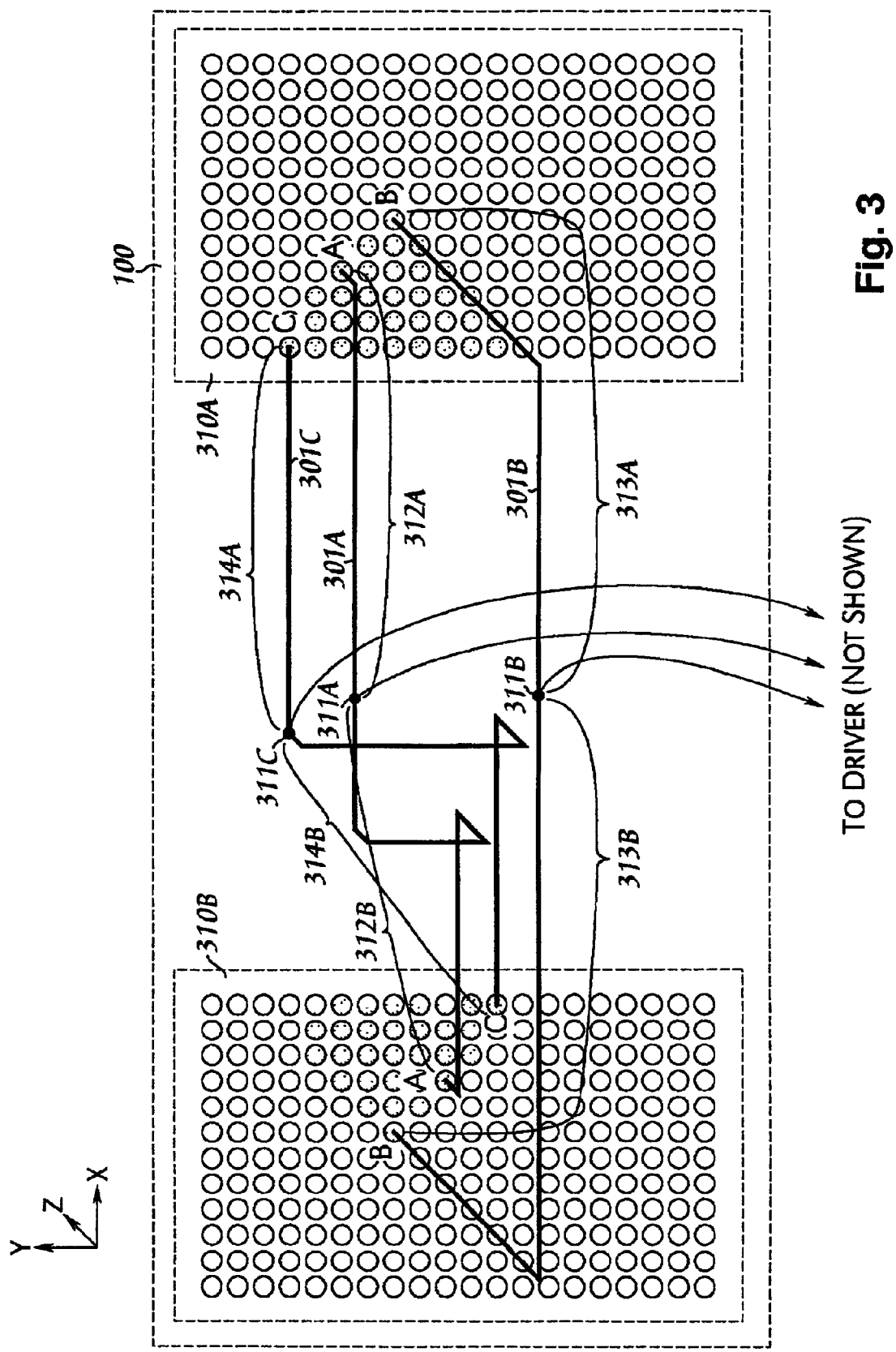
FIG. 3 illustrates a pin assignment with a triangular pattern that reduces the lengths of orthogonal interconnections in accordance with the present invention.

Referring to FIG. 2, orthogonal interconnection 201C is the longest orthogonal interconnection 201 between chip 210A and chip 210B based in part on the routing of orthogonal interconnection 201C through many layers in substrate of MCM 100. Orthogonal interconnection 201B may be the second longest orthogonal interconnection 201 between chip 210A and chip 210B. As stated in the Background Information section, the longer the distance of an interconnection between chips, the greater the time for a signal to be transmitted from one chip to another chip. Hence, the longer the distance of an interconnection between chips, the lower the processing speed of the MCM. If the length of the longest orthogonal interconnection may be minimized to be substantially the same length as the length of the second longest orthogonal interconnection, then the performance of the MCM may be improved. FIG. 3 illustrates a technique for limiting the length of the longest orthogonal interconnection 201C in FIG. 2 to be substantially the same length as the length of the second longest orthogonal interconnection 201B in FIG. 2. It has been observed that by exploiting the technique of FIG. 3 for diagonal interconnections that the length of the longest diagonal interconnection may be substantially the same length as the length of the second longest diagonal interconnection as discussed in greater detail in conjunction with FIG. 4. Further, it has been observed that by exploiting the technique of FIG. 3 for diagonal interconnections that the length of the longest diagonal interconnection may be substantially the same length as the length of the longest orthogonal interconnection as discussed in greater detail in conjunction with FIG. 4.

FIG. 3—Pin Assignment in a Triangular Pattern

FIG. 3 illustrates pin assignment in a triangular pattern for interconnections between chips. Referring to FIG. 3, FIG. 3 depicts three orthogonal interconnections 301A–C between chip 310A and chip 310B in MCM 100 that corresponds to orthogonal interconnections 201A–C between chip 210A and chip 210B, respectively, as illustrated in FIG. 2. Furthermore, in one embodiment, orthogonal interconnection 301A may comprise nets 312A, 312B separated at point 311A that corresponds to nets 212A, 212B, respectively, separated at point 211A as illustrated in FIG. 2. Further, in one embodiment, orthogonal interconnection 301B may comprise nets 313A, 313B separated at point 311B that corresponds to nets 213A, 213B, respectively, separated at point 211B as illustrated in FIG. 2. Further, in one embodiment, orthogonal interconnection 301C may comprise nets 314A, 314B separated at point 311C that corresponds to nets 214A, 214B, respectively, separated at point 211C as illustrated in FIG. 2. Chips 310A and chips 310B are configured substantially the same as chip 110. Chips 310A–B may collectively or individually be referred to as chips 310 or chip 310, respectively.

FIG. 3 illustrates that by forming pins in a triangular pattern that the length of the longest orthogonal interconnection 301C may be substantially the same length as the length of the second longest orthogonal interconnection 301B as discussed below. That is, the length of the longest orthogonal interconnection 301C may be within an acceptable margin of error equivalent to the length of the second longest orthogonal interconnection 301B. By assigning the pins to form a triangular pattern, the length of orthogonal interconnection 301C may be reduced by reducing the length of the via. That is, by assigning the pins to form a triangular pattern, the length of orthogonal interconnection 301C may be reduced by reducing the number of layers in the substrate of MCM 100 to be routed. Further, by assigning the pins to form a triangular pattern, the length of orthogonal interconnection 301B may be marginally increased due to expanding the length of orthogonal interconnection 301 further into chips 310A, 310B thereby expanding the length of the vias. By marginally expanding the length of orthogonal interconnection 301B and decreasing the length of orthogonal interconnection 301A, the length of orthogonal interconnection 301C may be substantially the same length as the length of orthogonal interconnection 301B. Consequently, the time of flight, i.e., the time for a signal to travel from one chip 310 to another chip 310, is substantially the same. Furthermore, the total length of orthogonal interconnections 301C and 301B is less when the pins used for these orthogonal interconnections form a triangular pattern than when the pins are traditionally assigned as illustrated in FIG. 2. Consequently, the time of flight, i.e., the time for a signal to travel from one chip 310 to another chip 310, is less when the pins form a triangular pattern as illustrated in FIG. 3 than when the pins are traditionally assigned as illustrated in FIG. 2.

It has been observed that by exploiting the technique of FIG. 3 for diagonal interconnections that the length of the longest diagonal interconnection may be substantially the same length as the length of the second longest diagonal interconnection as discussed below in conjunction with FIG. 4. Further, it has been observed that by exploiting the technique of FIG. 3 for diagonal interconnections that the length of the longest diagonal interconnection may be substantially the same length as the length of the longest orthogonal interconnection as discussed below in conjunction with FIG. 4.

Figure 4:
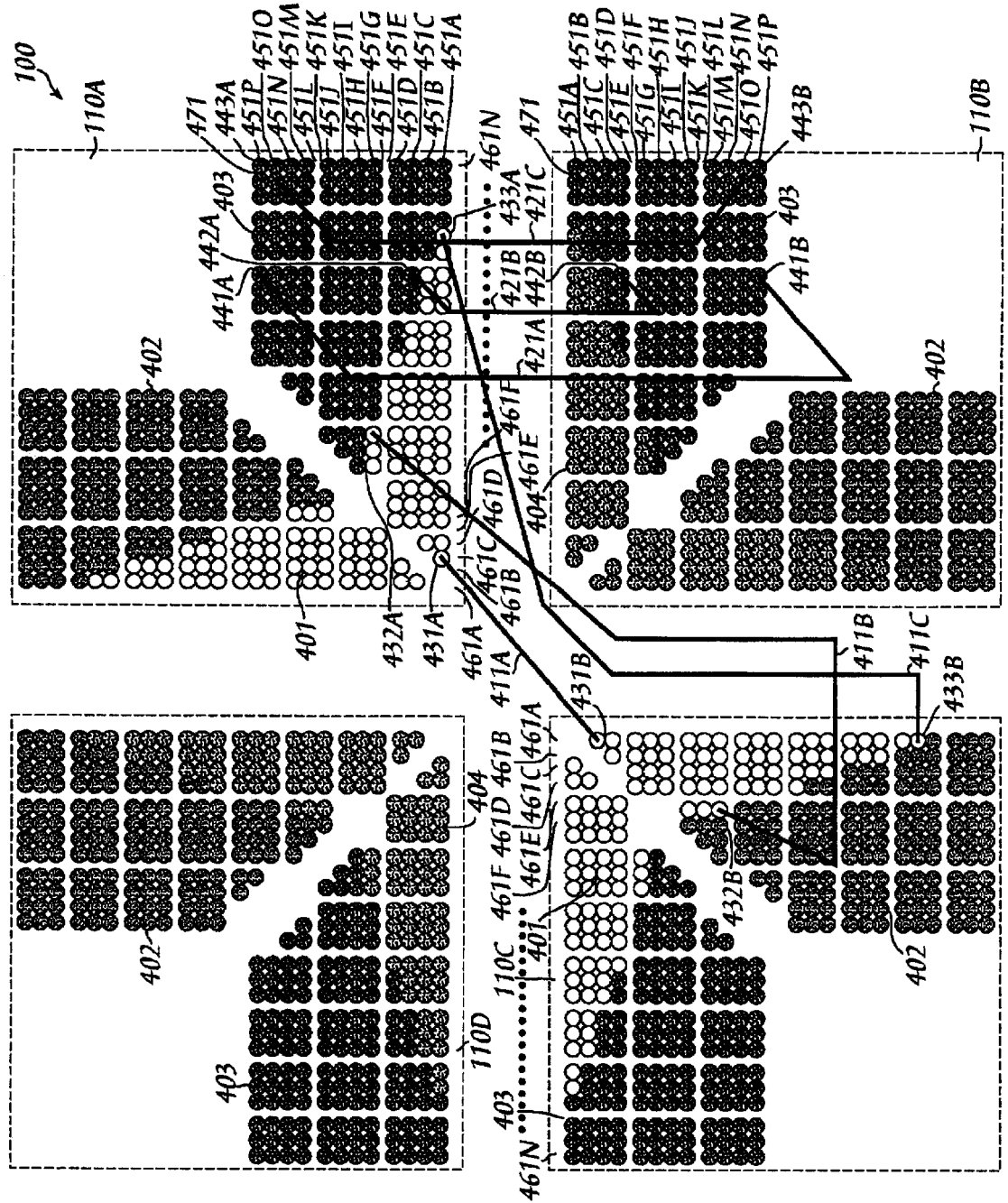
FIG. 4 illustrates an embodiment of the present invention of a multiple chip module with pins used for diagonal interconnections assigned in a triangular pattern.

FIG. 4—Assignment of Pins in a Triangular Pattern in Chips of Multi-Chip Module

FIG. 4 illustrates an embodiment of the present invention of MCM 100 (FIG. 1). Referring to FIG. 4, MCM 100 may comprise chips 110A–D (FIG. 1) each comprising a plurality of pins as indicated by circles of various shadings. The shadings are used to denote sets of pins having common characteristics, as described further below. Chips 110A–D may collectively or individually be referred to as chips 110 or chip 110. In one embodiment, each chip 110 may be configured to be substantially identical. Furthermore, in one embodiment, each chip 110 of MCM 100 may be rotated ninety degrees (90°) with respect to each adjacent chip 110 as illustrated in FIG. 4. It is noted that MCM 100 may comprise any number of chips 110 arranged in any type of pattern. It is further noted that FIG. 4 is illustrative.

As stated above, the interconnections between chips 110 adjacent to one another may commonly be referred to as "orthogonal" interconnections. The interconnections between chips 110 diagonal to one another may commonly be referred to as "diagonal" interconnections. Some pins in chips 110 may be used for orthogonal interconnections and some pins in chips 110 may be used for diagonal interconnections as illustrated in FIG. 4. It is further noted that some pins may not be shown in FIG. 4 as they may be reserved for non-interconnecting purposes, e.g., ground, power. Pins used for non-interconnecting purposes may be indicated by an empty space as shown in FIG. 4.

Referring to FIG. 4, pins labeled 401 (and denoted by open circles) in chips 110A, 110C may be used for diagonal interconnections between chips 110A, 110C. For example, diagonal interconnection 411A may be routed from pin 431A in chip 110A to pin 431B in chip 110C. Pins 431A, 431B may be located in correlated pin positions in each respective chip 110. Diagonal interconnection 411B may be routed from pin 432A in chip 110A to pin 432B in chip 110C. Pins 432A, 432B may be located in correlated pin positions in each respective chip 110. Further, diagonal interconnection 411C may be routed from pin 433A in chip 110A to pin 433B in chip 110C. Pins 433A, 433B may be located in correlated pin positions in each respective chip 110. Diagonal interconnections 411A–C may collectively or individually be referred to as diagonal interconnections 411 or diagonal interconnection 411, respectively. It is noted that there may be additional diagonal interconnections 411 between chips 110A, 110C but are not shown for ease of understanding. Similarly, pins labeled 404 (and denoted by cross hatch un-shaded circles) in chips 110B, 110D may be used for diagonal interconnections 411 between chips 110B, 110D. It is noted that there may be diagonal interconnections 411 between chips 110B, 110D but are not shown for ease of understanding.

Referring to FIG. 4, pins 402 (denoted by shaded hatching), 403 (denoted by shading) in chips 110A, 110B may be used for orthogonal interconnections between chips 110A, 110B. For example, orthogonal interconnection 421A may be routed from pin 441A in chip 110A to pin 441B in chip 110B. Pins 441A, 441B may be located in correlated pin positions in each respective chip 110. Orthogonal interconnection 421B may be routed from pin 442A in chip 110A to pin 442B in chip 110B. Pins 442A, 442B may be located in correlated pin positions in each respective chip 110. Further, orthogonal interconnection 421C may be routed from pin 443A in chip 110A to pin 443B in chip 110B. Pins 443A, 443B may be located in correlated pin positions in each respective chip 110. Orthogonal interconnection 421A may be the longest orthogonal interconnection illustrated in FIG. 4. Orthogonal interconnection 421A may be longer than orthogonal interconnection 421C since some of the pins in the column of pin 441A are used for diagonal interconnections. By having some of the pins in the column of pin 441A being used for diagonal interconnections, the route of orthogonal interconnection 421A may have to travel through additional layers of the substrate of MCM 100 than orthogonal interconnection 421C. Orthogonal interconnections 421A–C may collectively or individually be referred to as orthogonal interconnections 421 or orthogonal interconnection 421, respectively. It is noted that there may be additional orthogonal interconnections 421 between chips 110A, 110B but are not shown for ease of understanding. Similarly, pins 402, 403 in chips 110A, 110D may be used for orthogonal interconnections 421 between chips 110A, 110D. Pins 402, 403 in chips 110B, 110C may be used for orthogonal interconnections 421 between chips 110B, 110C. Pins 402, 403 in chips 110C, 110D may be used for orthogonal interconnections 421 between chips 110C, 110D. It is noted that these orthogonal interconnections 421 are not shown so as not to unnecessarily obscure the Figures.

As stated above, pins used for diagonal interconnections 411 may be selected to form a triangular pattern in order to conform the length of the longest diagonal interconnection 411, e.g., diagonal interconnection 411C, to be substantially the same length as the length of the second longest diagonal interconnection 411, e.g., diagonal interconnection 411B, as illustrated in FIG. 4.

Referring to FIG. 4, pins 401 in chips 110A and 110C may be assigned in a triangular pattern thereby allowing the longest diagonal interconnection 411 between chips 110A and 110C to be substantially the same length as the length of the second longest diagonal interconnection 411. For example, diagonal interconnection 411C is substantially the same length as diagonal interconnection 411B.

Furthermore, by assigning pins used for diagonal interconnections 411 in a triangular pattern, the longest diagonal interconnection 411, e.g., diagonal interconnection 411C, may be substantially the same length as the length of the longest orthogonal interconnection 421, e.g., diagonal interconnection 421A, as illustrated in FIG. 4. Hence, the longest diagonal interconnection 411, e.g., diagonal interconnection 411C, may have substantially the same time of flight, i.e., the time it takes a signal to travel from one pin of an interconnection to the other pin, as the longest orthogonal interconnection 421, e.g., diagonal interconnection 421A, as illustrated in FIG. 4.

As stated above, some pins in chips 110 may be used for orthogonal interconnections; whereas, other pins in chips 110 may be used for diagonal interconnections. A method implemented by a computer system for assigning which pins are to be used for diagonal interconnections is described below in conjunction with FIGS. 5–7.

Figure 5:
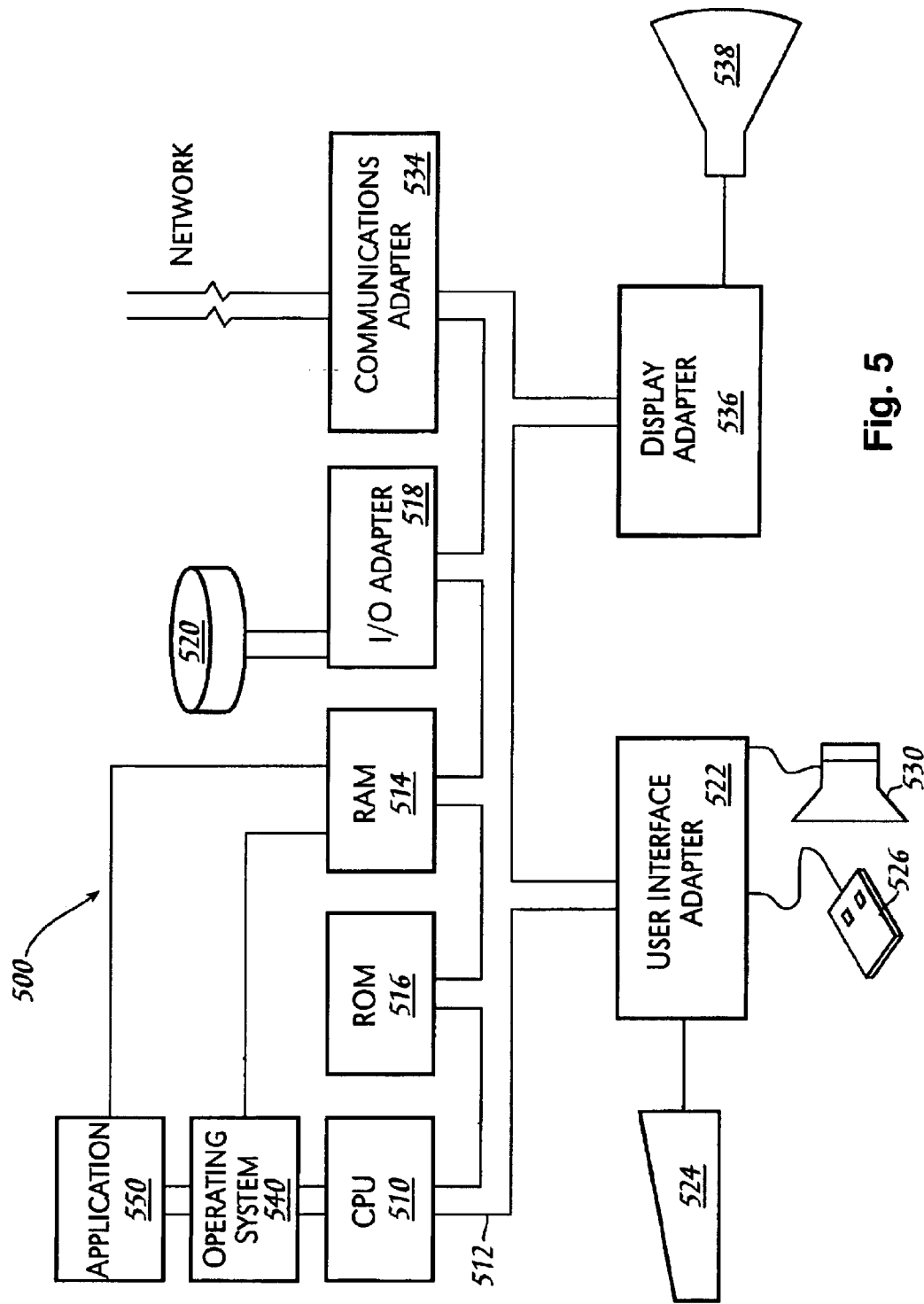
FIG. 5 illustrates an embodiment of the present invention of a computer system.

FIG. 5—Hardware Configuration of Computer System

FIG. 5 illustrates a typical hardware configuration of a computer system 500 which is representative of a hardware environment for practicing the present invention. Computer system 500 may have a central processing unit (CPU) 510 coupled to various other components by system bus 512. An operating system 540, may run on CPU 510 and provide control and coordinate the functions of the various components of FIG. 5. An application 550 in accordance with the principles of the present invention may run in conjunction with operating system 540 and provide calls to operating system 540 where the calls implement the various functions or services to be performed by application 550. Application 550 may include, for example, a program for identifying pin locations to be used for diagonal interconnections as discussed in FIGS. 7A–D. Read only memory (ROM) 516 may be coupled to system bus 512 and include a basic input/output system ("BIOS") that controls certain basic functions of computer system 500. Random access memory (RAM) 514, I/O adapter 518 and communications adapter 534 may also be coupled to system bus 512. It should be noted that software components including operating system 540 and application 550 may be loaded into RAM 514 which may be the computer system's main memory. I/O adapter 518 may be a small computer system interface ("SCSI") adapter that communicates with a disk unit 520, e.g., disk drive. It is noted that the program of the present invention that identifies pin locations to be used for diagonal interconnections, as discussed in FIGS. 7A–D, may reside in disk unit 520 or in application 550.

Communications adapter 534 may interconnect bus 512 with an outside network. Input/Output devices may also be connected to system bus 512 via a user interface adapter 522 and a display adapter 536. Keyboard 524, mouse 526 and speaker 530 may all be interconnected to bus 512 through user interface adapter 522. Event data may be inputted to computer system 500 through any of these devices. A display monitor 538 may be connected to system bus 512 by display adapter 536. In this manner, a user is capable of inputting, e.g., inputting a threshold value, inputting an updated threshold value, to computer system 500 through keyboard 524 or mouse 526 and receiving output from computer system 500 via display 538 or speaker 530.

Implementations of the invention include implementations as a computer system programmed to execute the method or methods described herein and as a computer program product. According to the computer system implementations, sets of instructions for executing the method or methods may be resident in the RAM 514 of one or more computer systems configured generally as described above. Until required by computer system 500, the set of instructions may be stored as a computer program product in another computer memory, for example, in disk unit 520. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 6:
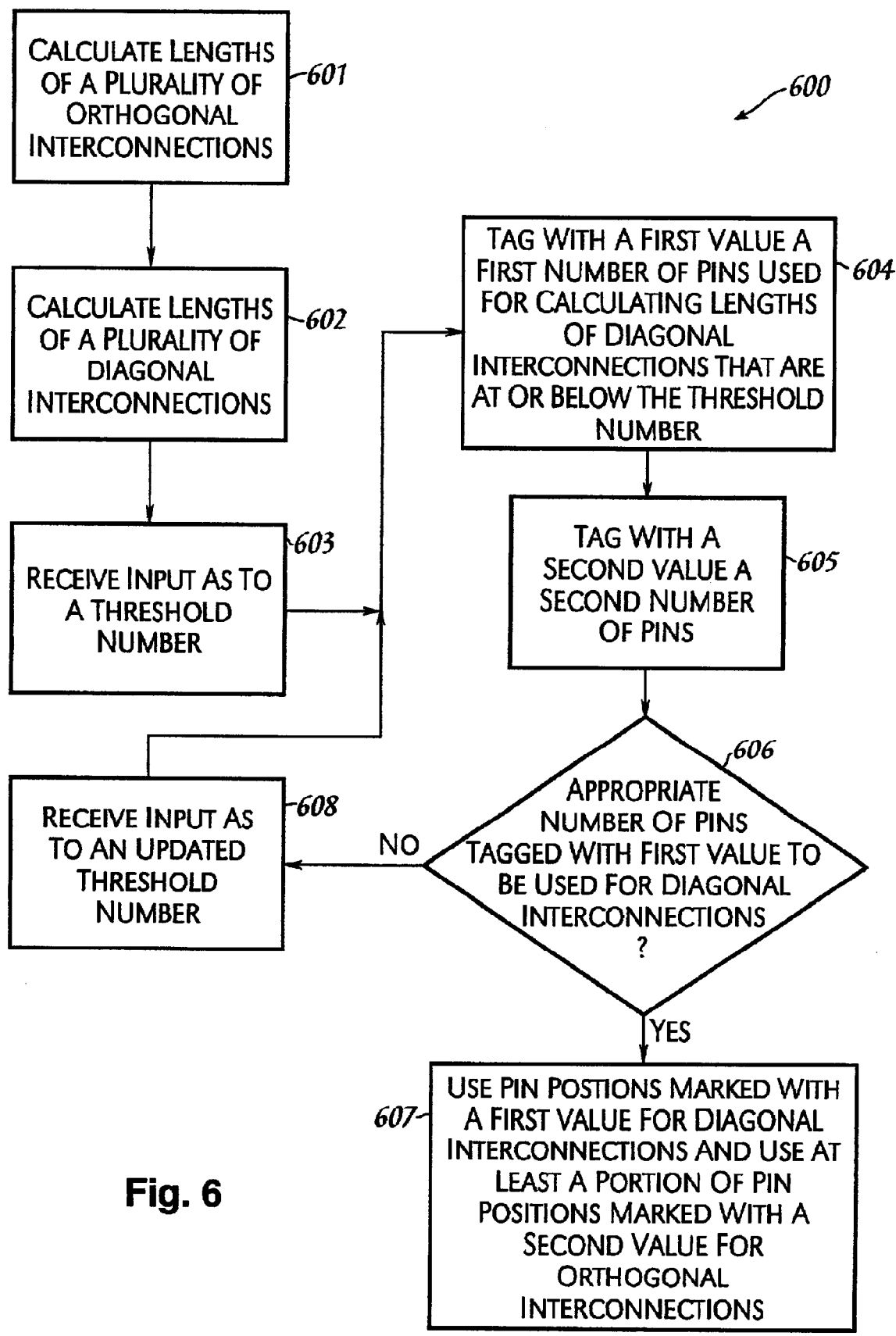
FIG. 6 is a flowchart of a method for identifying pin locations to be used for diagonal interconnections.

FIG. 6—Method for Identifying Pin Locations to be Used for Diagonal Interconnections FIG. 6 is a flowchart of one embodiment of the present invention of a method 600 for identifying pin locations in chip 110 (FIG. 1) to be used for diagonal interconnections. Method 600 will be discussed in conjunction with FIGS. 7A–D depicting a spreadsheet 700 illustrating the calculated lengths of the orthogonal and diagonal interconnections as well as which particular pins are to be used for diagonal interconnections determined in accordance with the present inventive principles as explained in greater detail further below. It is noted that FIGS. 7A–D are illustrative and is not to be construed in a limiting manner.

Referring to FIG. 6, in conjunction with FIGS. 4 and 7A–D, in step 601, the lengths of a plurality of orthogonal interconnections from a particular chip 110, e.g., chip 110A, to an adjacent chip 110, e.g., chip 110B, may be calculated. Referring to FIGS. 7A–D, a row 701 of orthogonal values, which may represent the length of orthogonal interconnections, thus calculated, where the values 702A–P represent distances in millimeters from pins in corresponding row/column combinations in adjacent chips 110. For example, the first value 702A in row 701 may refer to the distance between the pin position in chip 110, e.g., chip 110A, at row 451A/column 471 with the corresponding pin position in the adjacent chip 110, e.g., chip 110B. The first value may be a zero value because lengths in FIG. 7 may be differential distances relative to the first length value. The second value 702B in row 701 may refer to the differential distance between the pin position in chip 110, e.g., chip 110A, at row 451B/column 471 with the corresponding pin in the adjacent chip 110, e.g., chip 110B, and so forth. The second value 702B, e.g., 0.8007 millimeters, may represent the additional distance in length to the first value length. It is noted that value 702P in row 701 represents the longest differential orthogonal distance, e.g., 12.0102 millimeters, between the pin position in chip 110, e.g., chip 110A, at row 451P/column 171 and the corresponding pin in the adjacent chip 110, e.g., chip 110B. It is further noted that the orthogonal distances may be calculated using any column of adjacent chips 110 and that the above is illustrative. It is further noted that some of the values in row 701, e.g., value 702E, may refer to the differential distance between a pin position reserved for non-connecting purposes, e.g., power, ground, in chip 110, e.g., row 451E, column 471 in chip 110A, with the corresponding pin in the adjacent chip 110, e.g., chip 110B.

Figure 7A:
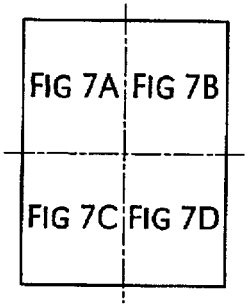
Figure 7B:
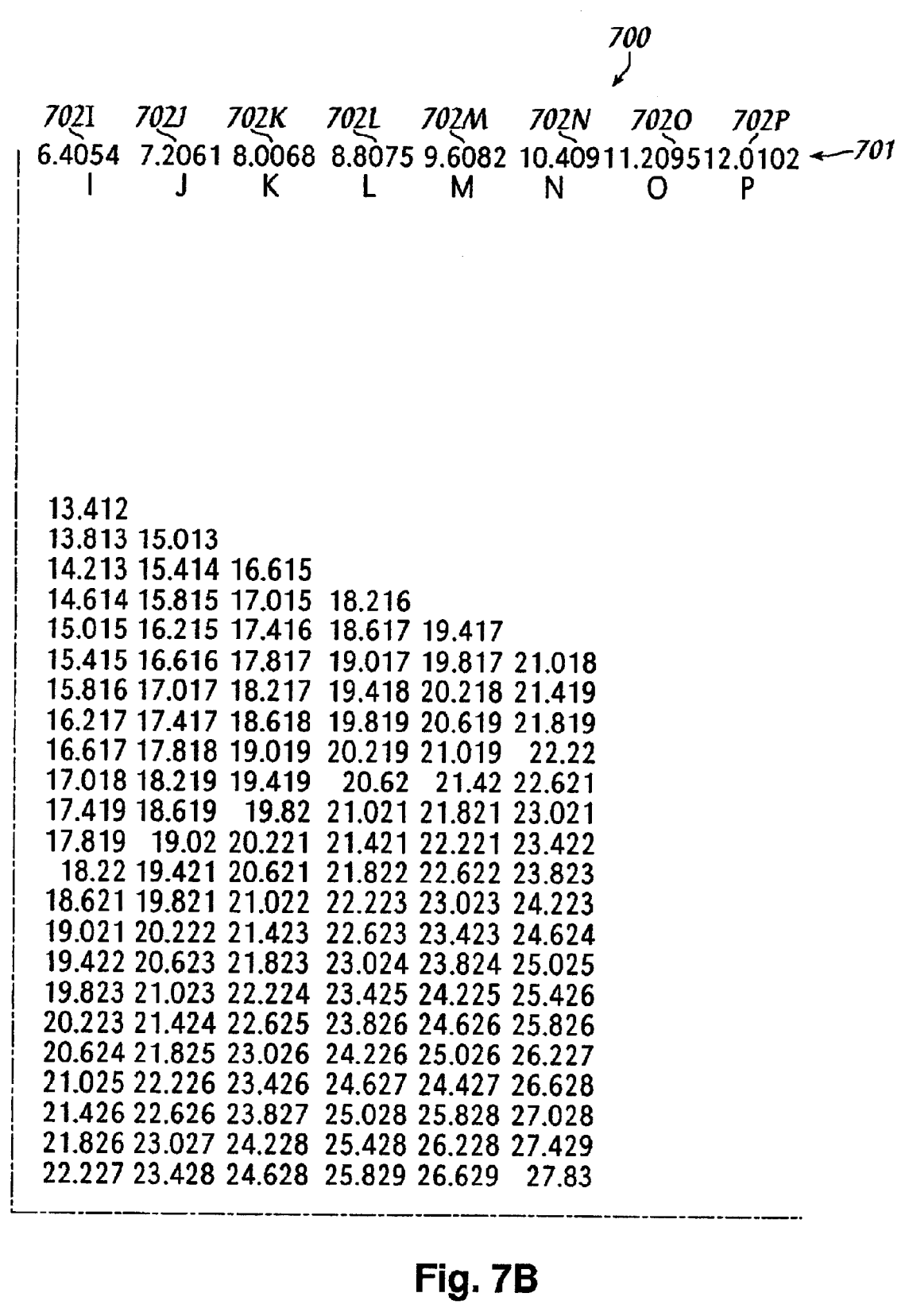

In step 602, the lengths of a plurality of diagonal interconnections from a particular chip 110, e.g., chip 110A, to a diagonal chip 110, e.g., chip 110C, may be calculated. Referring to FIGS. 7A–B, spreadsheet 700 comprises rows 703A–N, where N may be any number, and columns labeled "A–P" used to indicate the lengths of calculated diagonal interconnections between diagonal chips 110. Rows 703A–N may collectively or individually be referred to as rows 703 or row 703, respectively. Each particular row/column combination may represent a particular pin location on a particular chip 110, e.g., chip 110A. Further, each particular row/column combination may comprise a value for a length of a particular diagonal interconnection. The value may represent the differential distance in millimeters with respect to the shortest orthogonal distance. That is, the value in each particular row/column combination in spreadsheet 700 may represent the length of a particular diagonal interconnection in millimeters that is additional to value 702A. (It is noted that the zero value for the differential distance in row 703A has been suppressed in FIGS. 7A–B because the corresponding pin located at row 451A/column 461A is reserved for non-connecting purposes.) For example, the value, e.g., 0.2003 millimeters, at row 703B/column "A" may refer to the additional distance in length to value 702A between the pin position in chip 110, e.g., chip 110A, at row 451B/column 461A with the corresponding pin in the diagonal chip 110, e.g., chip 110C. The value, e.g., 0.601 millimeters, at row 703C/column "A" may refer to the additional distance in length to value 702A between the pin position in chip 110, e.g., chip 110A, at row 451C/ column 461A with the corresponding pin in the diagonal chip 110, e.g., chip 110C. The value, e.g., 1.0017 millimeters, at row 703D/column "A" may refer to the additional distance in length to value 702A between the pin position reserved for non-connecting purposes, e.g., power, ground, in chip 110, e.g., chip 110A, at row 451D/ column 461A with the corresponding reserved pin position in the diagonal chip 110, e.g., chip 110C, and so forth. Hence, the values in rows 703 for each column may represent the value of the differential distance between the pin position in chip 110, e.g., chip 110A, at various rows 451 for a particular column 461 with the corresponding pin in the diagonal chip 110, e.g., chip 110C. The values in columns for each row 703 may represent the value of the differential distance between the pin position in chip 110, e.g., chip 110A, at various columns 461 for a particular row 451 with the corresponding pin in the diagonal chip 110, e.g., chip 110C, as described below.

The value in row 703C/column "B" may refer to the differential distance between the pin position in chip 110, e.g., chip 110A, at row 451C/column 461B with the corresponding pin in the diagonal chip 110, e.g., chip 110C. The value in row 703D/column "B" may refer to the differential distance between the pin position reserved for non-connecting purposes in chip 110, e.g., chip 110A, at row 451D/column 461B with the corresponding reserved pin in the diagonal chip 110, e.g., chip 110C. The value in row 703D/column "C" may refer to the differential distance between the pin position reserved for non-connecting purposes in chip 110, e.g., chip 110A, at row 451D/column 461C with the corresponding reserved pin in the diagonal chip 110, e.g., chip 110C. The value in row 703E/column "B" may refer to the differential distance between the pin position in chip 110, e.g., chip 110A, at row 451E/column 461B with the corresponding pin in the diagonal chip 110, e.g., chip 110C. The value in row 703E/column "C" may refer to the differential distance between the pin position in chip 110, e.g., chip 110A, at row 451E/column 461C with the corresponding pin in the diagonal chip 110, e.g., chip 110C. The value in row 703E/column "D" may refer to the differential distance between the pin position in chip 110, e.g., chip 110A, at row 451E/column 461D with the corresponding pin in the diagonal chip 110, e.g., chip 110C, and so forth. It is noted that some values in row 703/column combinations were not shown for the purposes of readability.

In step 603, a threshold value, e.g., 4.607 millimeters, may be received from a user. The threshold value may indicate a maximum differential diagonal distance, i.e., the additional distance to value 702A, associated with a pin in a chip 110, e.g., chip 110A, used for a diagonal interconnection with a corresponding pin in the diagonal chip 110, e.g., chip 110C. The threshold value, e.g., 4.607 millimeters, received may be less than or equal to the longest differential orthogonal distance, e.g., 12.0102 millimeters, thereby ensuring that the longest diagonal interconnection may be substantially the same length or shorter as the longest orthogonal interconnection. Furthermore, since the threshold value, e.g., 4.607 millimeters, received may be less than or equal to the longest differential orthogonal distance, the length of the longest diagonal interconnection may be substantially the same length as the second longest diagonal interconnection.

In step 604, a first number, e.g., sixteen, of available pin positions in a chip 110, e.g., chip 110A, associated with differential distances at or below the threshold value may be tagged with a first value, e.g., number "1", as illustrated in FIG. 7C. That is, a first number, e.g., sixteen, of pin positions not reserved for non-connecting purposes that are associated with differential distances at or below the threshold value may be tagged with a first value, e.g., number "1", as illustrated in FIG. 7C. The first number of pin positions tagged with the first value may be the pin positions in a chip 110, e.g., chip 110A, whose lengths for diagonal interconnections with corresponding pin positions in a diagonal chip 110, e.g., chip 110C, are at or below the threshold value. For example, referring to FIGS. 7A–D, each pin position tagged with the first value had a diagonal interconnection length smaller than 4.607 millimeters.

In step 605, the remaining available pin positions may be tagged with a second value, e.g., number "0", as illustrated in FIGS. 7C–D. That is, the remaining number of pin positions reserved for non-connecting purposes may be tagged with a second value, e.g., number "0", as illustrated in FIGS. 7C–D. It is noted that not all of the pin positions that would be marked with the second value, e.g., number "0", are shown in FIGS. 7C–D for the purposes of readability.

In step 606, a determination may be made as to whether the first number, e.g., sixteen, of pins tagged with a first value is an appropriate number of pin locations to be used for diagonal interconnections. That is, a determination may be made as to whether the first number of pins tagged with a first value is not too high or too low of a number of pin locations to be used for diagonal interconnections. If the first number, e.g., sixteen, of pins tagged is an appropriate number of pin locations to be used for diagonal interconnections, then, in step 607, the pin positions marked with a first value may be used for diagonal interconnections. The pattern formed by the set of pins used for diagonal interconnections may appear to form a triangular pattern as indicated by the triangular formed "1's" on FIG. 7C. Further, at least a portion of the pin positions marked with a second value may be used for orthogonal interconnections.

If the first number, e.g., sixteen, of pins tagged is not an appropriate number of pin locations to be used for diagonal interconnections, then, in step 608, an updated threshold value may be received from the user. An updated threshold value may be a value that is greater than or less than the previously used threshold value. Upon receiving the updated threshold value, the number of available pin positions in a chip 110, e.g., chip 110A, associated with differential distances at or below the updated threshold value may be tagged with a first value, e.g., number "1", in step 604.

It is noted that method 600 may be executed in a different order presented and that the order presented in the discussion of FIG. 6 is illustrative. It is further noted that certain steps in FIG. 6 may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A multiple chip module, comprising:
   a first chip;
   a second chip located adjacent to said first chip, wherein said second chip is interconnected with said first chip by one or more orthogonal interconnections; and
   a third chip located diagonal to said first chip, wherein said third chip is interconnected with said first chip by one or more diagonal interconnections, wherein said one or more diagonal interconnections between said first chip and said third chip are interconnected between a first set of pins located on said first chip and a second set of pins located on said third chip, wherein a pattern formed by said first set of pins and said second set of pins is a triangular pattern.

2. The multiple chip module as recited in claim 1, wherein a longest diagonal interconnection is substantially a same length as a second longest diagonal interconnection.

3. The multiple chip module as recited in claim 1, wherein a longest diagonal interconnection is substantially a same length as a longest orthogonal interconnection.

4. The multiple chip module as recited in claim 1, wherein said first and said second chip are rotated ninety degrees with respect to one another.

* * * * *